Figures 1, 2:
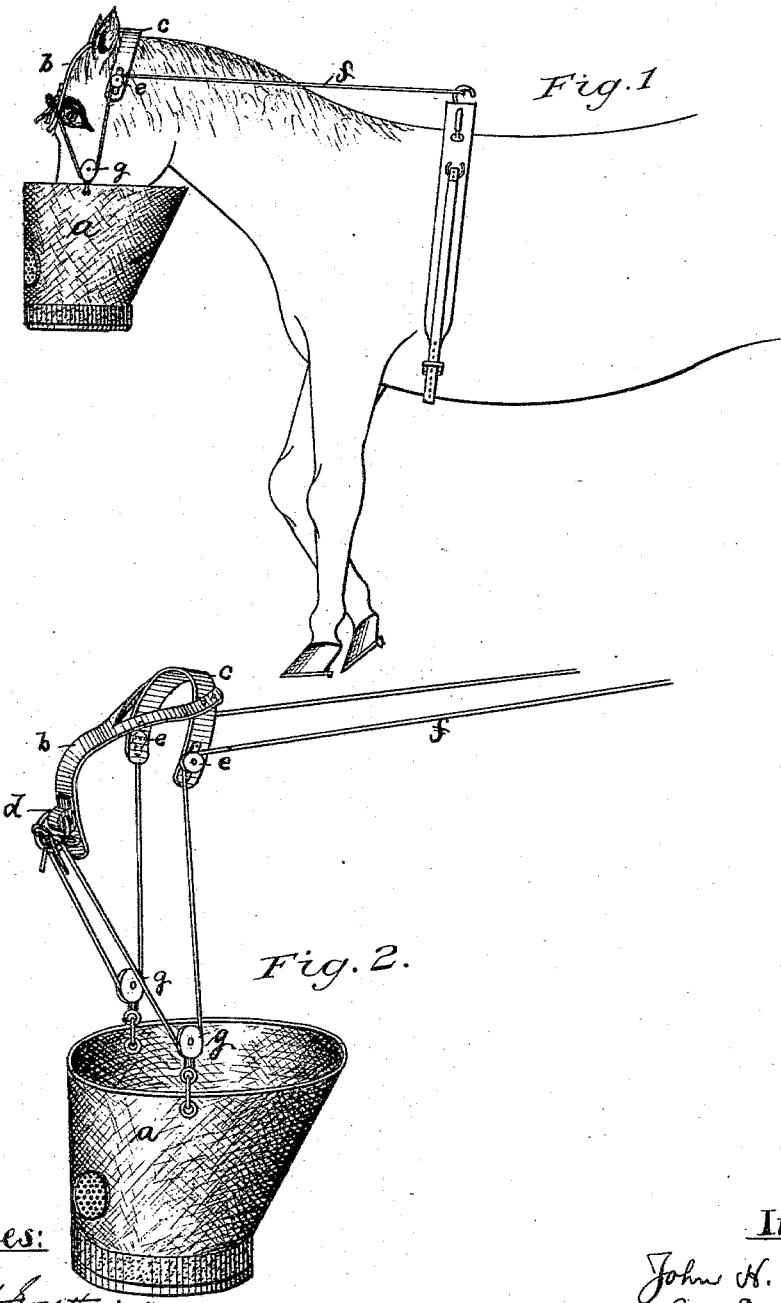

(No Model.)

J. H. PALMER.
FEED BAG ATTACHMENT.

No. 289,129. Patented Nov. 27, 1883.

Witnesses:

Inventor:
John H. Palmer
By Ernest C. Webb
Atty.

UNITED STATES PATENT OFFICE.

JOHN H. PALMER, OF NEW YORK, N. Y.

FEED-BAG ATTACHMENT.

SPECIFICATION forming part of Letters Patent No. 289,129, dated November 27, 1883.

Application filed July 28, 1883. (No model.)

*To all whom it may concern:*

Be it known that I, JOHN H. PALMER, a citizen of the United States, residing at New York city, in the county of New York and State of New York, have invented a certain new and Improved Regulator for Feed-Bags, of which the following is a full, clear, and exact description.

This invention relates to an attachment for feed-bags, whereby the bag will be adjusted automatically by the movement of the head of the animal using the same relatively to the amount of feed therein, the object being to enable a horse to feed naturally, quickly, and without waste of feed.

My invention consists of the combination, with a feed-bag, of a supporting head-piece consisting of a front strap adapted to rest on the forehead and a back strap which lies close on the neck back of the ears, a strap or cord connected to the front strap, the feed-bag, and back strap, and adapted to loop over the check-hook, and a series of pulley-blocks for guiding said strap or cord, whereby the bag is raised or lowered by the motion of the animal's head, all as hereinafter fully described.

In the accompanying drawings, in which like parts are designated by similar letters of reference, Figure 1 is a side view of my attachment shown applied to a bag in position for use; and Fig. 2, a perspective view of the attachment and bag, the looped end of the strap or cord being broken away.

$a$ designates a feed-bag, which may be of the usual or any suitable construction.

The supporting head-piece of my attachment consists of a front strap, $b$, and a back strap, $c$, which may be made in one piece, or of two pieces riveted or otherwise fastened together. At the lower end of the front strap, $b$, a loop is formed, to which a ring, $d$, is secured, and to each end of strap $c$ a pulley-block, $e$, is fastened.

$f$ designates a strap or cord, the free ends of which are tied to the ring $d$. Before being tied to the ring the ends of said strap or cord are passed through the pulley-blocks $e$, and thence downwardly and through pulley-blocks $g$, which are attached to the sides of the bag.

My attachment is applied by placing the head-piece in position on the animal, the strap $c$ resting on the neck back of the ears, and strap $b$ on the forehead. The strap $f$ is then adjusted to the length necessary to permit the requisite rise and fall of the bag, and is then looped over the check-hook. It will thus be seen that as the animal moves its head the bag will be raised or lowered correspondingly, and the contents will be brought within convenient feeding distance, whereby the loss of feed is entirely obviated, and the animal will eat naturally and rapidly.

What I claim as my invention, and desire to secure by Letters Patent, is—

The combination, substantially as shown and described, of the front strap, $b$, provided with a ring, $d$, the back strap, $c$, to which the front strap is connected, the pulleys $e$ $e$ at either end of the back strap, the nose-bag having pulleys $g$, and the strap or cord $f$, attached to the ring $d$, and extending thence through the bag-pulleys, and thence through the back-strap pulleys to the harness, as and for the purpose set forth.

In testimony whereof I have hereunto set my hand this 16th day of July, A. D. 1883.

JOHN H. PALMER.

Witnesses:
ERNEST C. WEBB,
ARTHUR C. WEBB.